US006851329B2

(12) United States Patent
Chiang

(10) Patent No.: US 6,851,329 B2
(45) Date of Patent: Feb. 8, 2005

(54) SPEED CHANGE GEAR DEVICE

(76) Inventor: Tun-Hung Chiang, 235 P.O. Box 10-69, Chung-Ho Taipei (TW)

( * ) Notice: Subject to any disclaimer, the term of this patent is extended or adjusted under 35 U.S.C. 154(b) by 0 days.

(21) Appl. No.: 10/402,795

(22) Filed: Mar. 29, 2003

(65) Prior Publication Data
US 2004/0187619 A1 Sep. 30, 2004

(51) Int. Cl.[7] ............................. F16H 3/14; B60K 20/00
(52) U.S. Cl. ......................................... 74/355; 74/473.1
(58) Field of Search ............................... 74/473.37, 404, 74/355, 323, 325, 329, 376–377, 437, 440, 473.1, 473.13, 473.36

(56) References Cited

U.S. PATENT DOCUMENTS

| | | | | |
|---|---|---|---|---|
| 1,077,354 A | * | 11/1913 | Lemay ........................ 74/323 |
| 2,294,230 A | * | 8/1942 | Grace ........................ 74/473.1 |
| 2,314,549 A | * | 3/1943 | Milbrath ..................... 74/376 |
| 3,645,153 A | * | 2/1972 | Northcraft ................... 74/370 |
| 3,735,644 A | * | 5/1973 | Benson, Jr. .................. 74/355 |
| 4,141,256 A | * | 2/1979 | Wilson et al. ................ 74/64 |
| 4,924,720 A | * | 5/1990 | Shust ......................... 74/377 |
| 4,960,008 A | * | 10/1990 | Yen et al. .................... 74/335 |
| 5,309,782 A | * | 5/1994 | Seaman ....................... 74/359 |
| 6,389,918 B1 | * | 5/2002 | Wang ........................ 74/473.1 |

* cited by examiner

Primary Examiner—Roger Pang

(57) ABSTRACT

A speed change gear device is disclosed. A speed change gear box has an input gear. The lower gear is firmly secured with a gear shaft. A speed change disk is installed between two gears mounted on a gear shaft. A movable piece is placed in the annular groove of a speed change disk. A lower connecting plate is mounted at one side of the movable piece. Another end of an upper connecting plate is installed to a driving rod. Another end of the driving rod is connected to a linkage. Another end of the linkage is firmly secured to a gear switching rod. Thereby, by moving the gear switching rod, a switching rotary shaft can rotate so that the movable piece move the speed change disk. Thus the gears are switched to move forwards, move rightwards or to an idle gear.

1 Claim, 8 Drawing Sheets

SPEED CHANGE GEAR DEVICE

BACKGROUND OF THE INVENTION

The present invention relates to speed change gear devices, and particularly to a speed change gear device, in that by moving a gear switching rod, a switching rotary shaft can rotate so that the movable piece move the speed change disk. Thus the gears are switched to move forwards, move rightwards or to an idle gear.

Although the prior art speed change gear box can make the car to move forward, backward or in an idle gear condition. Moreover, the speed change gear box achieves the object by a complicated structure. Thereby, faults easily occur. Moreover, the prior art speed change gear box is difficult in manufacturing and longer manufacturing time is required. Thereby, there is an eager demand for improving this prior art defects.

SUMMARY OF THE INVENTION

Accordingly, the primary object of the present invention is to provide a speed change gear device. An inner side of a speed change gear box has an input gear. An upper and a lower sides of the outer edge of the input gear are engaged with respective gears. A center of the lower gear is firmly secured with a gear shaft. A front end of the gear shaft is installed with a gear. A right side of the gear is connected to another gear. A center of the gear is installed with a gear shaft. A front of the gear shaft is installed with a further gear. A speed change disk is installed between two gears mounted on the gear shaft. An axial surface of the speed change disk is formed with an annular groove. A movable piece is placed in the annular groove. A lower connecting plate is mounted at one side of the movable piece. Another end of an upper connecting plate 31 is installed to a driving rod. Another end of the driving rod is connected to a linkage. Another end of the linkage is firmly secured to a gear switching rod. Thereby, by moving the gear switching rod, a switching rotary shaft can rotate so that the movable piece move the speed change disk. Thus the gears are switched to move forwards, move rightwards or to an idle gear.

The various objects and advantages of the present invention will be more readily understood from the following detailed description when read in conjunction with the appended drawing.

BRIEF DESCRIPTION OF THE DRAWINGS

FIG. 2-1 is a position schematic view about the switching rotary shaft of the present invention.

FIG. 3-1 is a schematic view showing another gear switching rod of the present invention.

FIG. 4-1 shows another embodiment of the present invention.

FIG. 4-2 shows a further embodiment of the present invention.

BRIEF DESCRIPTION OF THE PREFERRED EMBODIMENTS

Figure 1:
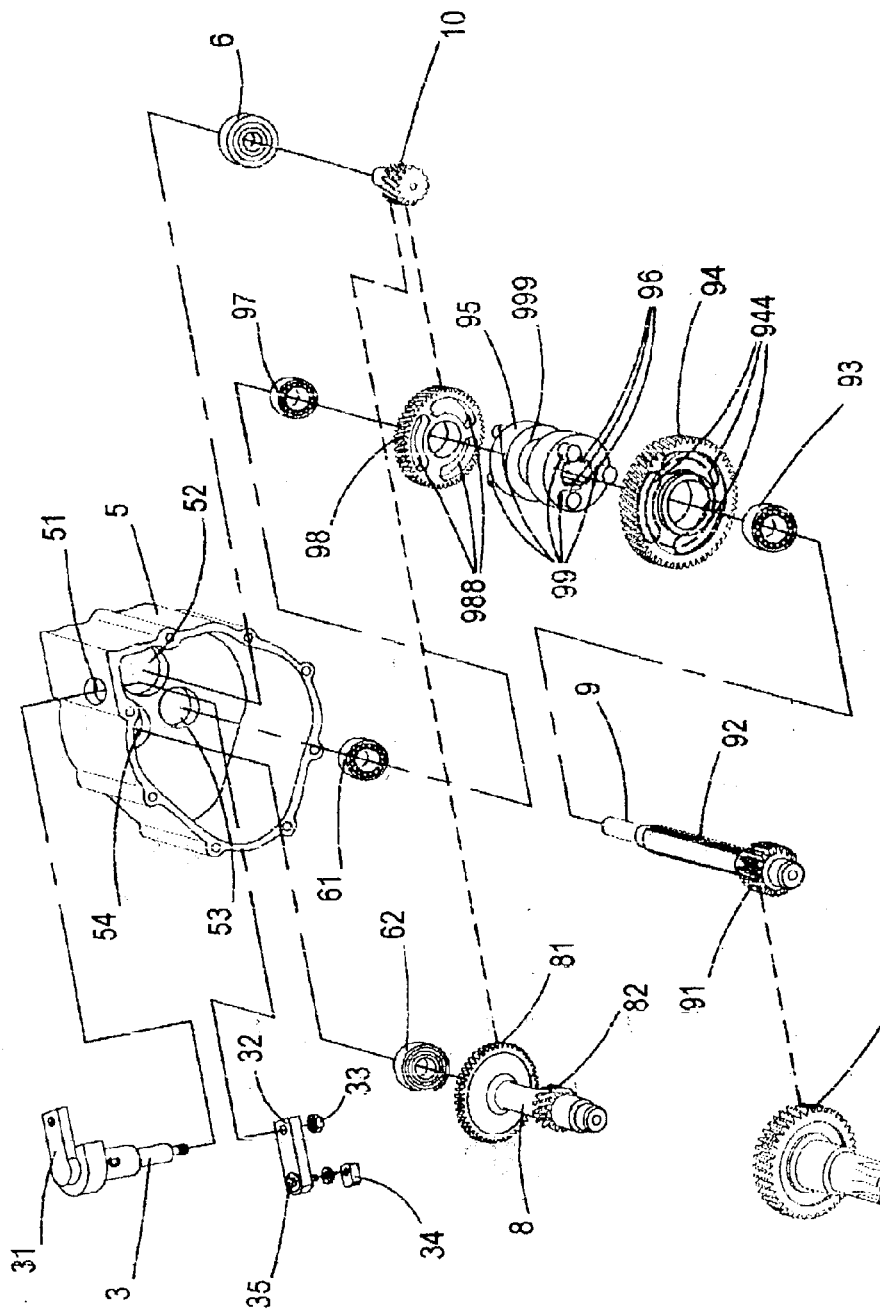
FIG. 1 is an exploded perspective view of the present invention.
Figure 2:
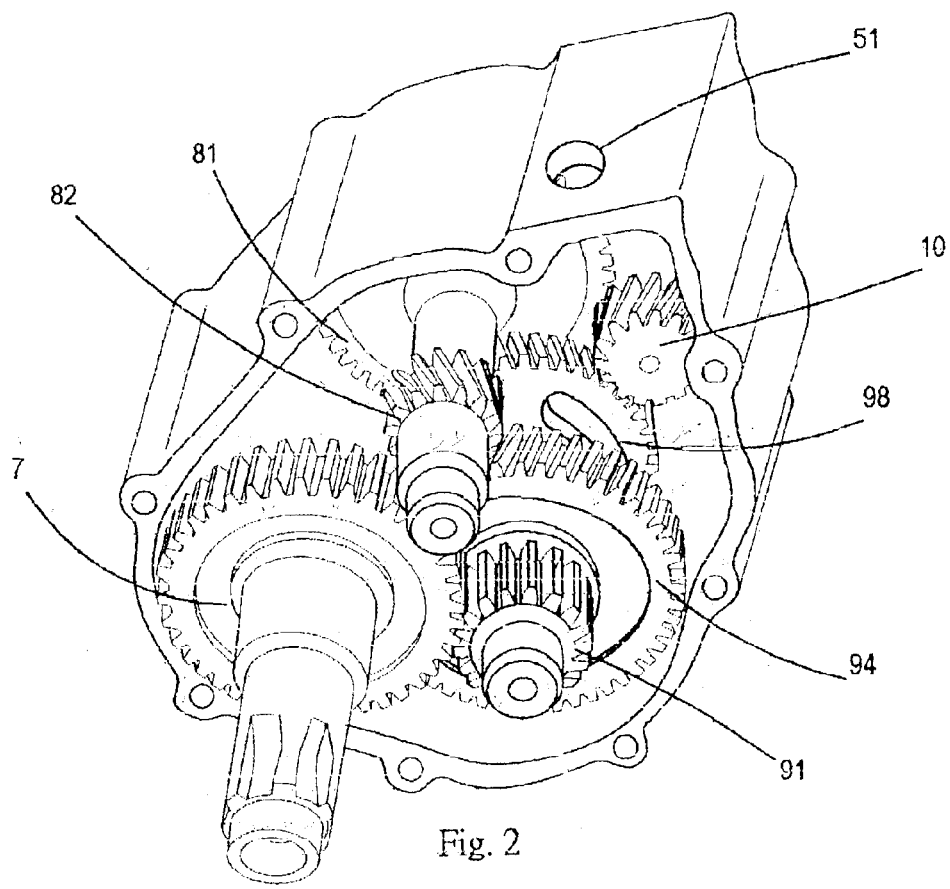
FIG. 2 is a partial assembled perspective view of the present invention.
Figures 1, 2:
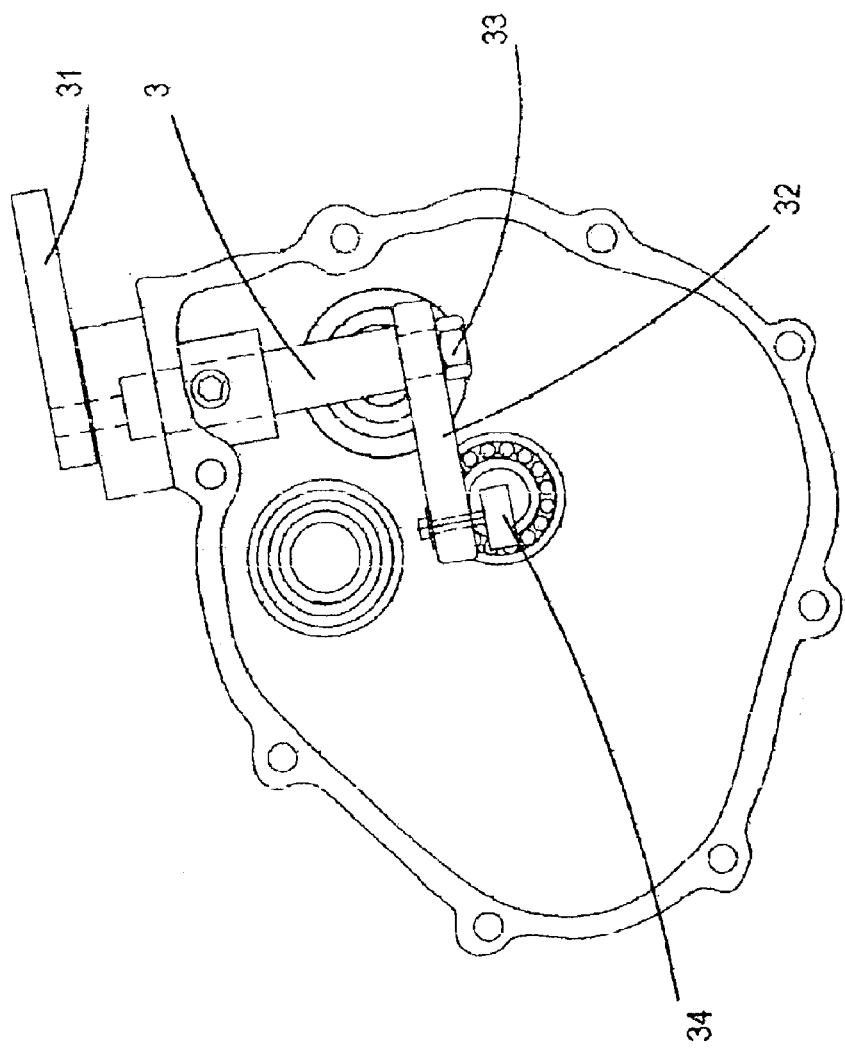

Referring to FIGS. 1, 2 and 2-1, the speed change gear box of the present invention includes a gear switching rod 2, a gear switching positioning plate 21, a linkage 22, a driving rod 23, a switching rotary shaft 3, an upper connecting plate 31, a lower connecting plate 32, a moveable piece 34, an output gear 7, a speed change disk 95, an input gear 10, two gear shafts 8 and 9, and fives gears 81, 82, 91, 94 and 98.

A lower side of the upper connecting plate 31 is firmly secured with a switching rotary shaft 3. A lower side of the switching rotary shaft 3 is installed with a lower connecting plate 32. The lower connecting plate 32 is locked to a switching rotary shaft 3. A front end of the lower connecting plate 32 has a movable piece 34.

A speed change disk 95 resists against the movable piece 34. Thus, the movement of a driving rod 23 can drive the upper connecting plate 31 to rotate (referring to FIGS. 3-1). Then the upper connecting plate 31 drives the switching rotary shaft 3 to rotate and thus the lower connecting plate 32 below the switching rotary shaft 3 will rotate. Then the movable piece 34 at the front end of the lower connecting plate 32 will push the speed change disk 95. Thereby, the speed change disk 95 will move rightwards and leftwards.

An outer edge of the switching rotary shaft 3 is engaged with a speed change gear box 5. An interior of the speed change gear box 5 is formed with a via hole 52. A first bearing 6 is installed within the via hole 52. A center of the first bearing 6 is penetrated by an input gear 10. Thereby, by the input gear 10, power of an engine can be input to the speed change gear box 5.

A first gear 81, and a second gear 98 are installed at an outer edge of the input gear 10. A center of the first gear 81 is extended with a first gear shaft 8. One outer side of the first gear shaft 8 is engaged with a second bearing 62 which is buckled to a concave hole 54 of the speed change gear box 5. Another side of the first gear shaft 8 is firmly secured with the a third gear 82 so that by the rotation of the gear shaft 8, the first and third gears can be driven.

A fourth gear 94 is installed at an outer edge of the third gear 82. A lateral wall of the fourth gear 94 is formed with a plurality of grooves 944. The grooves 944 serve to resist against a left buckling block 99 of the speed change disk 95 so that the fourth gear 94 and the speed change disk 95 rotate synchronously.

A third bearing 93 is installed in an inner hole of the gear 94. A second gear shaft 9 is inserted into an inner hole of the third bearing 93. By the bearing 93, the fourth gear 94 can separate from the gear shaft 9. A front end of the gear shaft 9 is firmly secured with a fifth gear 91 so that the gear shaft 9 and the gear 91 can rotate synchronously. Axial surface of the gear shaft 9 is formed with a plurality of recesses 92. Each recess 92 resists against a rib 96 extended from a surface of the speed change disk 95. Thereby, the speed change disk 95 and the gear shaft 9 can rotate synchronously.

An axial center of the speed change disk 95 is formed with an annular slot 999 which resists against the movable piece 34. Thereby, by moving the movable piece 34, the speed change disk 95 can move rightwards or leftwards. A right side of the speed change disk 95 is installed with a second gear 98. A disk surface of the second gear 98 is formed with a plurality of buckling slots 988 for resisting right buckling block 99 of the speed change disk 95 so that the second gear 98 and the speed change disk 95 can rotate synchronously. Moreover, in the present invention, the speed change disk has an unique annular trench and the movable piece 34 is placed within the annular trench;

A fourth bearing 97 is installed in one central hole of the gear 98. A central hole of the fourth bearing 97 is penetrated by the gear shaft 9. Thereby, by the bearing 97, the second gear 98 is separated from the gear shaft 9. A rear end of the gear shaft 9 is engaged with the first bearing 61 which resists against the concave hole 53 of the speed change gear box 5. An outer edge of the fifth gear 91 is engaged with an output gear 7 so that by the output gear, power is transferred to a wheel shaft.

Figure 3:
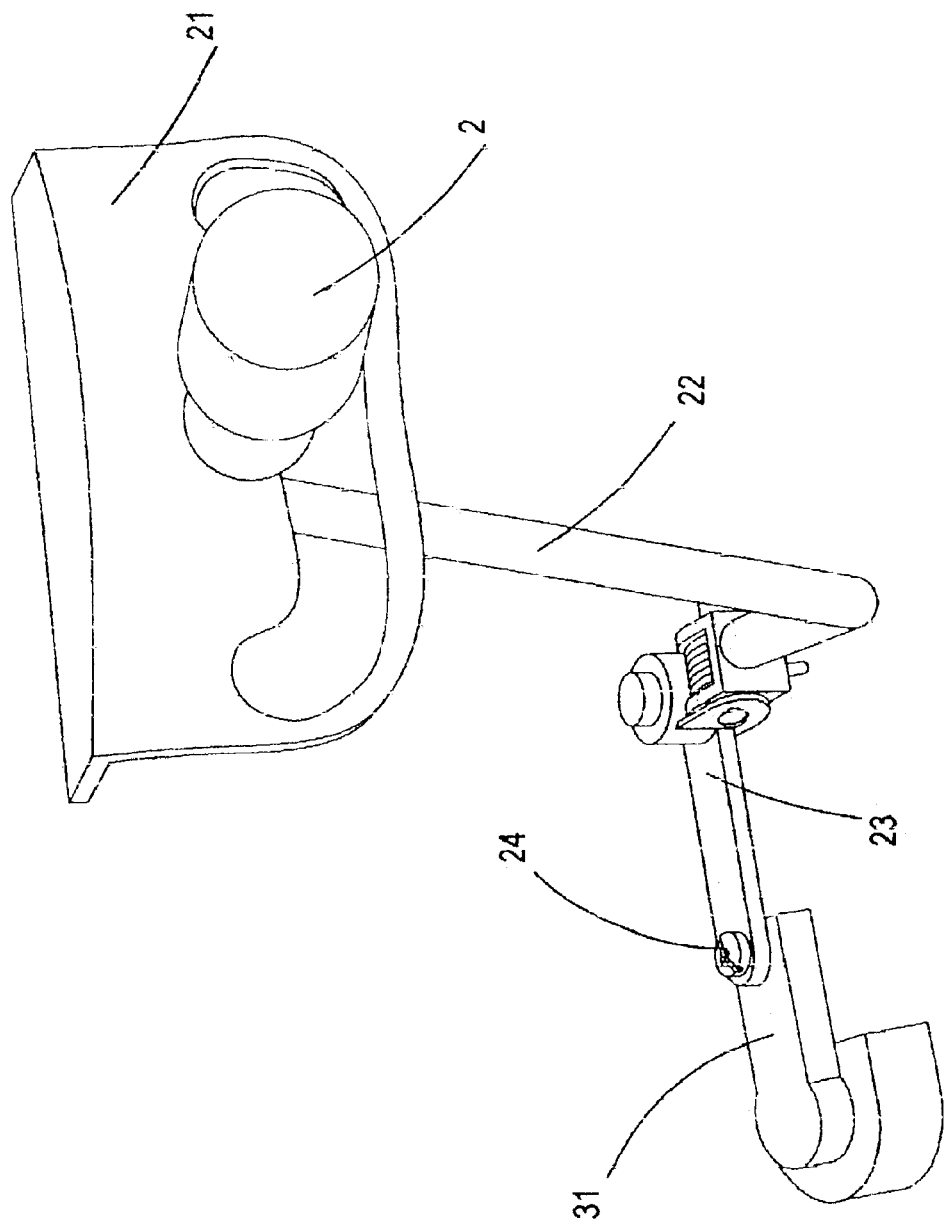
FIG. 3 is a schematic view showing the gear switching rod of the present invention.
Figures 1, 3:
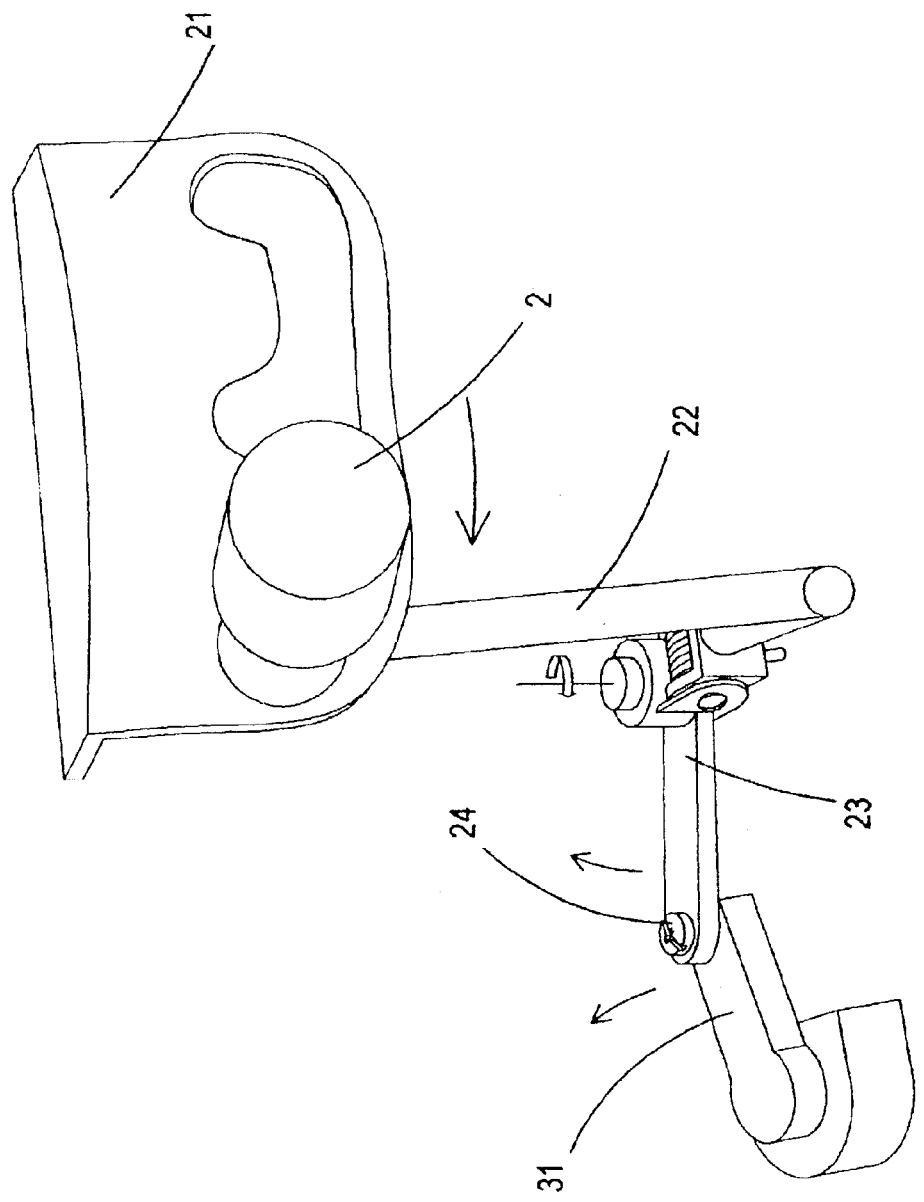

Then a right side of the upper connecting plate 31 is installed with a positioning shaft 24 (referring to FIGS. 3, 3-1). A right side of the positioning shaft 24 is installed with the driving rod 23. Another end of the driving rod 23 is connected to one end of a linkage 22. Another end of the linkage 22 is installed with a gear switching rod 2. An outer edge of the gear switching rod 2 is installed with an gear switching positioning plate 21 so that by moving the gear switching rod 2 to a groove of the gear switching positioning plate 21, the linkage 22 drives the driving rod 23 to rotate so that the upper connecting plate 31 connected to the driving rod 2 will rotate and thus to drive the movable piece 34 to move. As a result, the movable piece 34 will move the speed change disk 95.

Figure 4:
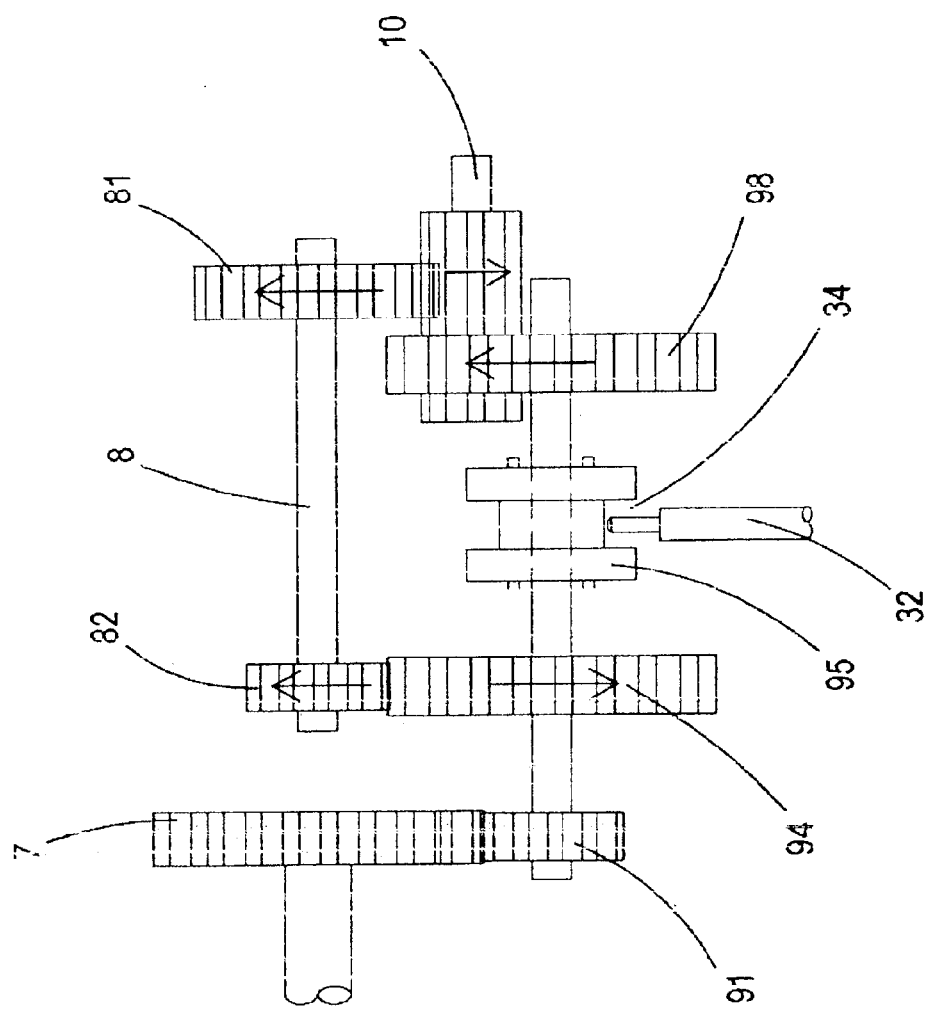
FIG. 4 shows the embodiment of the present invention.
Figures 1, 4:
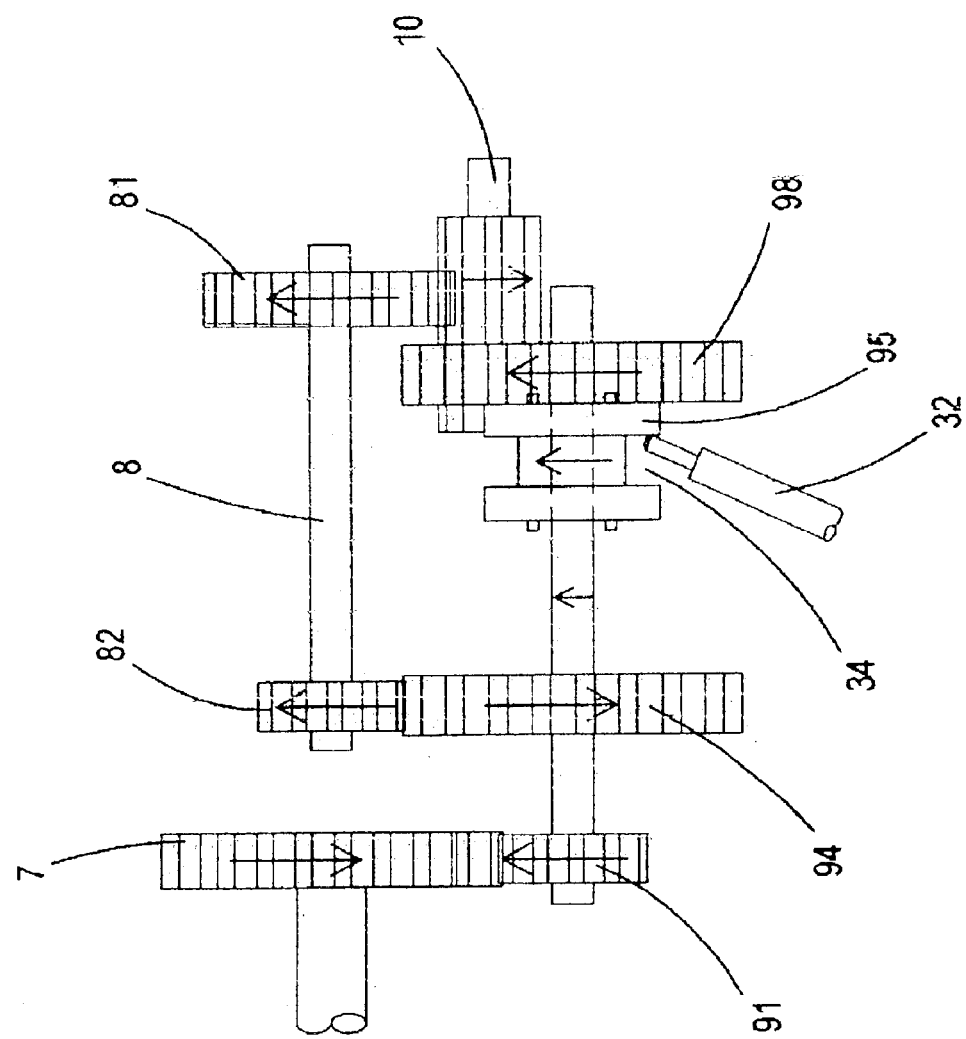
Figures 2, 4:
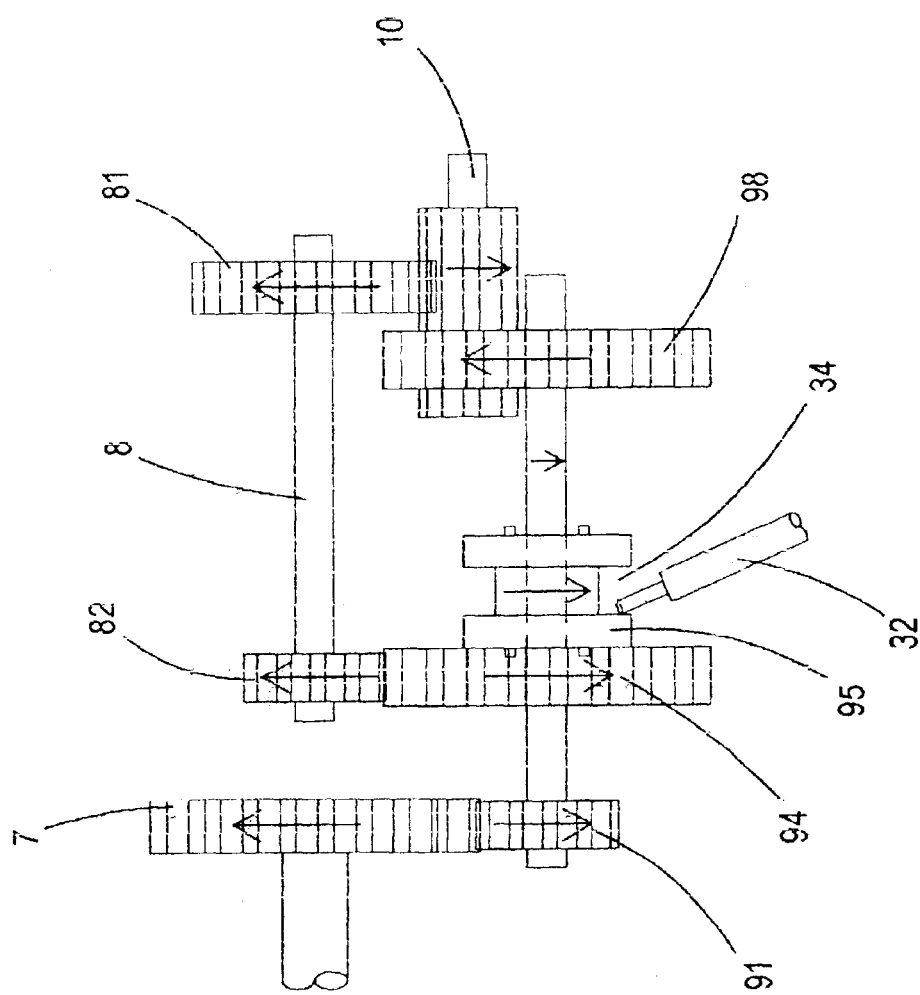

Furthermore, when the lower connecting plate 32 is placed in a center (referring to FIG. 4), the speed change disk 95 is in a center position. Therefore the gear shaft 9 will not rotate. Thus, the output gear 7 will not rotate. Furthermore, when the lower connecting plate 32 rotates rightwards. The movable piece 34 will move the speed change disk 95 to resist against the gear 98. Then the gear shaft 9 and the gear 98 will rotate synchronously. Therefore the output gear 7 and the input gear 10 rotate along same direction (referring to FIG. 4-1). Moreover, when the lower connecting plate 32 rotates leftwards. The movable piece 34 will move the speed change disk 95 to resist against the gear 94. Then the gear shaft 9 and the gear 94 move along same direction. As a result, the output gear 7 and the input gear 10 rotates along opposite directions (referring to FIG. 4-2).

In application, the lower connecting plate 32 is placed at a center position. The speed change disk 95 is positioned at the center position. Thereby, the gear shaft does not rotate. Therefore output gears will not rotate. When the lower connecting plate 32 rotates rightwards, the moveable piece moves the speed change disk to resist against the gear. Then the gear shaft and the gear rotate along the same direction. Thus, output gear and the input gear rotate along the same direction. Then the rotation is transferred to the wheel shaft. When the lower connecting plate 32 rotates leftwards, the moveable piece moves the speed change disk 95 to resist against the gear. Then the gear shaft and the gear move along the same direction. Therefore the output gear and the input gear rotate along opposite directions.

Advantage of the present invention is that the speed change gear box has a simple structure so that the maintenance and update works can be performed easily. The speed change gear box has a lower fault rate and can be made easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A speed change gear device comprising:

an upper connecting plate; a lower side of the upper connecting plate being firmly secured with a switching rotary shaft; a lower side of the switching rotary shaft being installed with a lower connecting plate; the lower connecting plate being locked to a switching rotary shaft; a front end of the lower connecting plate having a movable piece;

a speed change disk resisting against the movable piece; wherein the movement of a driving rod drives the upper connecting plate to rotate; then the upper connecting plate drives the switching rotary shaft to rotate and thus the lower connecting plate below the switching rotary shaft will rotate; then the movable piece at the front end of the lower connecting plate pushes the speed change disk; thereby, the speed change disk will move rightwards and leftwards; wherein the speed change disk has an unique annular trench and the movable piece is placed within the annular trench;

a speed change gear box being engaged to an outer edge of the switching rotary shaft; an interior of the speed change gear box being formed with a via hole; a first bearing being installed within the via hole; a center of the first bearing being penetrated by an input gear; thereby, by the input gear, power of an engine can be input to the speed change gear box;

a first gear, and a second gear being installed at an outer edge of the input gear; a center of the first gear being extended with a first gear shaft; one outer side of the first gear shaft being engaged with a second bearing which is buckled to a concave hole of the speed change gear box; another side of the first gear shaft being firmly secured with a third gear so that by the rotation of the first gear shaft 8, the first and third gears is driven;

a fourth gear being installed at an outer edge of the third gear; a lateral wall of the fourth gear being formed with a plurality of grooves; the grooves serving to resist against a left buckling block of the speed change disk so that the fourth gear and the speed change disk rotate synchronously;

a third bearing being installed in an inner hole of the fourth gear; a second gear shaft being inserted into an inner hole of the third bearing; by the third bearing, the fourth gear can separate from the second gear shaft; a front end of the second gear shaft being firmly secured with a fifth gear so that the second gear shaft and the fifth gear rotates synchronously; an axial surface of the second gear shaft being formed with a plurality of recesses; each recess resisting against a rib extended from a surface of the speed change disk; thereby, the speed change disk and the second gear shaft rotates synchronously;

an axial center of the speed change disk being formed with an annular slot which resists against the movable piece; thereby, by moving the movable piece, the speed change disk moves rightwards or leftwards; a right side of the speed change disk being installed with the second gear; a disk surface of the second gear being formed with a plurality of buckling slots for resisting the right buckling block of the speed change disk so that the second gear and the speed change disk rotates synchronously;

a fourth bearing being installed in one central hole of the second gear; a central hole of the fourth bearing being penetrated by the second gear shaft; thereby, by the fourth bearing, the second gear being separated from the second gear shaft; a rear end of the gear shaft being engaged with the first bearing which resists against the concave hole of the speed change gear box; an outer edge of the fifth gear being engaged with an output gear so that by the output gear, power is transferred to a wheel shaft;

wherein a right side of the upper connecting plate is installed with a positioning shaft; a right side of the positioning shaft is installed with the driving rod; another end of the driving rod is connected to one end of a linkage; another end of the linkage is installed with a gear switching rod; an outer edge of the gear switching rod is installed with an gear switching positioning plate so that by moving the gear switching rod to a groove of the gear switching positioning plate, and then the linkage drives the driving rod to rotate so that the upper connecting plate connected to the driving rod will rotate and thus to drive the movable piece to move; as a result, the movable piece will move the speed change disk.

* * * * *